US010574155B2

(12) United States Patent
Song et al.

(10) Patent No.: US 10,574,155 B2
(45) Date of Patent: Feb. 25, 2020

(54) SPHERICAL TRIBOELECTRIC NANOGENERATOR

(71) Applicant: AGENCY FOR DEFENSE DEVELOPMENT, Daejeon (KR)

(72) Inventors: Insang Song, Daejeon (KR); Woonbong Hwang, Gyeongsangbuk-do (KR); Dongsung Kim, Gyeongsangbuk-do (KR); Jaeyoon Sim, Gyeongsangbuk-do (KR); Jeongwon Lee, Gyeongsangbuk-do (KR); Kwangseok Lee, Gyeongsangbuk-do (KR)

(73) Assignee: AGENCY FOR DEFENSE DEVELOPMENT (KR)

( * ) Notice: Subject to any disclaimer, the term of this patent is extended or adjusted under 35 U.S.C. 154(b) by 103 days.

(21) Appl. No.: 15/879,129

(22) Filed: Jan. 24, 2018

(65) Prior Publication Data

US 2019/0028040 A1    Jan. 24, 2019

(30) Foreign Application Priority Data

Jul. 20, 2017    (KR) .......................... 10-2017-0092208

(51) Int. Cl.
  *H02N 1/04*    (2006.01)
(52) U.S. Cl.
  CPC ..................... *H02N 1/04* (2013.01)
(58) Field of Classification Search
  CPC .................................................. H02N 1/04
  USPC ........................................ 310/308, 309, 310
  See application file for complete search history.

(56) References Cited

U.S. PATENT DOCUMENTS

| 7,446,450 | B2 * | 11/2008 | Boland | ..................... H02N 1/08 |
| | | | | 290/1 R |
| 9,126,198 | B2 * | 9/2015 | Yoshikawa | ......... B01L 3/50273 |
| 9,571,009 | B2 * | 2/2017 | Wang | ....................... H02N 1/04 |
| 2008/0264506 | A1 * | 10/2008 | Beerling | ........... B01L 3/502792 |
| | | | | 137/831 |

(Continued)

FOREIGN PATENT DOCUMENTS

KR    101727242 B1    4/2017

OTHER PUBLICATIONS

Office Action dated Nov. 19, 2018 in corresponding Korean Patent Application No. 10-2017-0092208.

(Continued)

*Primary Examiner* — John K Kim
(74) *Attorney, Agent, or Firm* — Ostrolenk Faber LLP

(57) ABSTRACT

The present invention relates to a spherical triboelectric nanogenerator. A spherical triboelectric nanogenerator according to the present invention includes a case having an inner space in a round shape and provided with an electrode layer, and a charged body located in the inner space and movable by external force, wherein the case includes an inner charged layer formed on an inner surface of the electrode layer to be contactable with the charged body, and an outer charged layer formed to surround an outer surface of the electrode layer, and wherein electricity is generated based on at least one of friction between the outer charged layer and an external fluid and friction between the inner charged layer and the charged body, which is generated as the charged body is moved due to external force applied by the fluid.

9 Claims, 4 Drawing Sheets

(56) References Cited

U.S. PATENT DOCUMENTS

| | | | | |
|---|---|---|---|---|
| 2014/0292138 A1* | 10/2014 | Wang | ......................... | H02N 1/04 |
| | | | | 310/300 |
| 2017/0236990 A1* | 8/2017 | Park | ......................... | H02N 1/04 |
| | | | | 310/306 |
| 2018/0294745 A1* | 10/2018 | Park | ......................... | H02N 1/04 |
| 2019/0028040 A1* | 1/2019 | Song | ......................... | H02N 1/04 |
| 2019/0040166 A1* | 2/2019 | Chien | ................... | C08F 120/06 |

OTHER PUBLICATIONS

Yange Feng, et al., "A New Protocol Toward High Output TENG With Polyimide as Charge Storage Layer," Nano Energy 38 (2017), pp. 467-476 (Jun. 13, 2017).

Office Action dated May 24, 2018 in corresponding Korean Patent Application No. 10-2017-0092208.

Xiaofeng Wang, et al., "Triboelectric Nanogenerator Based on Fully Enclosed Rolling Spherical Structure for Harvesting Low-Frequency Water Wave Energy," Advanced Energy Materials, 2015, 1501467, pp. 1-9 (Nov. 5, 2015).

Zong-Hong Lin, et al., "Dual-Mode Triboelectric Nanogenerator for Harvesting Water Energy and as a Self-Powered Ethanol Nanosensor," ACS NANO, vol. 8, No. 6, pp. 6440-6448 (May 1, 2014).

Zong-Hong Lin, "Enhanced Triboelectric Nanogenerators and Triboelectric Nanosensor Using Chemically Modified $TiO_2$ Nanomaterials," ACS NANO., vol. 7, No. 5, pp. 4554-4560 (Apr. 18, 2013).

* cited by examiner

SPHERICAL TRIBOELECTRIC NANOGENERATOR

CROSS-REFERENCE TO RELATED APPLICATION

Pursuant to 35 USC § 119 (a), this application claims the benefit of an earlier filing date and priority to Korean Application No. 10-2017-0092208, filed on Jul. 20, 2017, the contents of which are incorporated by reference herein in its entirety.

BACKGROUND OF THE INVENTION

1. Field of the Invention

The present invention relates to a spherical (sphere-shaped) triboelectric nanogenerator for harvesting wave energy.

2. Background of the Related Art

Energy harvesting is a technology that converts waste energy without being used in a surrounding environment into high electric energy. Therefore, the energy harvesting is eco-friendly in energy conversion and efficient in recycling unused energy.

Particularly, kinetic energy such as a human motion, vibration of surroundings, wind or sound is abundant and can be found everywhere. Thus, the kinetic energy is highly useful in energy harvesting.

In order to harvest such kinetic energy, an electric method, an electromagnetic method, a piezoelectric method and the like have been used. Specifically, in order to harvest the kinetic energy, a triboelectric generator is used in energy harvesting.

The triboelectric generator includes two different charged materials, so as to generate induced current using surface charge (static electricity) which is generated when the two different charged materials come into contact with each other.

At this time, the triboelectric generator uses, as a method of generating induced current, a contact-separation method in which contact and separation of two different charged materials are repeated. A typical energy harvesting technology is a technology of generating energy without a connection with an external power source by way of converting mechanical energy, which is to commonly encountered in surroundings, into electric energy.

Recently, a triboelectric nanogenerator (TENG) system, which produces electric energy using surface charge due to friction and thusly-generated induced charge, has been newly proposed.

A triboelectric nanogeneration technology is a technology of harvesting electric energy using triboelectricity and static electricity, which are generated when different materials generate friction due to external force.

The triboelectric nanogenerator has high efficiency, high usability and excellent accessibility compared to other systems. For this reason, the triboelectric nanogenerator is attracting attention as a system adapted to the needs of the times to develop sustainable energy sources.

That is, this technology is systemically simple in configuration including a charged layer in which friction occurs and an electrode layer in which induced current flows due to the charged layer, and thus has better accessibility than other energy harvesting technologies. In addition, this is a technology to be applied in various manners because of generating voltage and current even from a momentary minute movement.

Hereinafter, the prior art related to the triboelectric nanogenerator will be described.

Korean Patent Registration No. 10-1727242 (Laid-open: Apr. 10, 2017) discloses "Triboelectric nanogenerator."

Specifically, the document relates to a triboelectric nanogenerator for generating power according to a triboelectric method. The triboelectric nanogenerator according to the prior art includes first and second insulating layers, a conductive layer interposed between the first and second insulating layers, and a nanostructure disposed on a surface of the first insulating layer.

Further, the prior art discloses a configuration that electric charges are induced as a distance between an object and the first insulating layer having the nanostructure increases and decreases.

On the other hand, as a power source for the triboelectric nanogeneration technology, energy sources that are produced in nature and disappear as they are often used. Among others, many researches are being conducted on waves and winds, which are continuous and infinite power sources.

However, there is a problem of low efficiency due to a limitation in a low frequency domain.

SUMMARY OF THE INVENTION

The present invention is directed to solving the above-mentioned problems and other problems. Another object of the present invention is to provide a spherical triboelectric nanogenerator, capable of efficiently harvesting energy even in a low frequency domain by applying a spherical shape to a triboelectric nanogenerator for harvesting waves.

According to one aspect of the present invention to achieve the above aspect and others, there is provided a sphere-shaped (spherical) triboelectric nanogenerator, including a case having an inner space in a round (circular) shape and provided with an electrode layer, and a charged body disposed in the inner space and movable by external force.

The case may include an inner charged layer formed on an inner surface of the electrode layer in a manner of being contactable with the charged body, and an outer charged layer formed to surround an outer surface of the electrode layer.

Electricity may be generated based on at least one of friction between the outer charged layer and an external fluid and friction between the inner charged layer and the charged body, which is generated as the charged body is moved due to external force applied by the fluid.

In one embodiment, the inner charged layer may be formed on a remaining portion except for a part of an inner surface of the electrode layer so that the part of the inner surface of the electrode layer can be brought into contact with the charged body.

In another embodiment, the outer charged layer may be formed of a material having hydrophobicity.

In another embodiment, the inner charged layer may be formed of a fluorine-based polymer material that facilitates electron acquisition.

In another embodiment, the charged body may be realized in a round shape with a surface having a nanostructure.

In another embodiment, the generator may further include a storage layer formed on at least one of a position between the electrode layer and the inner charged layer and a position between the electrode layer and the outer charged layer, to store generated electric energy.

At this time, the storage layer may be formed as an oxide layer to which a nanostructure is applied.

In another embodiment, the generator may further include a support unit connected to the case or the charged body to be fixed on the ground.

In another embodiment, the fluid may be positively charged and the outer charged layer may be negatively charged due to the friction between the outer charged layer and the fluid, and an induced current may be generated in the electrode layer by the negative charged outer charged layer in response to a movement of the fluid.

In another embodiment, the inner charged layer and the charged body may be charged into different charges, respectively, due to friction therebetween, and induced current may be generated by a movement of negative or positive charges toward the electrode layer such that the electrode layer is charged by the charges electrified in the inner charged layer.

According to another aspect of the present invention, there is provided a spherical triboelectric nanogenerator, including a case having an inner space in a round shape and provided with an electrode layer, and a charged body located in the inner space and movable by external force due to waves.

The case may include an inner charged layer formed on an inner surface of the electrode layer in a manner of being contactable with the charged body, and an outer charged layer formed to surround an outer surface of the electrode layer.

Water may be positively charged and the outer charged layer is negatively charged when the water is brought into contact with the outer charged layer due to waves, so as to generate induced current, and also the induced current may be generated in response to a movement of charges generated between the charged body and the inner charged layer while the charged body is moved by the external force due to the waves.

DETAILED DESCRIPTION OF THE PREFERRED EMBODIMENT

Figure 1:
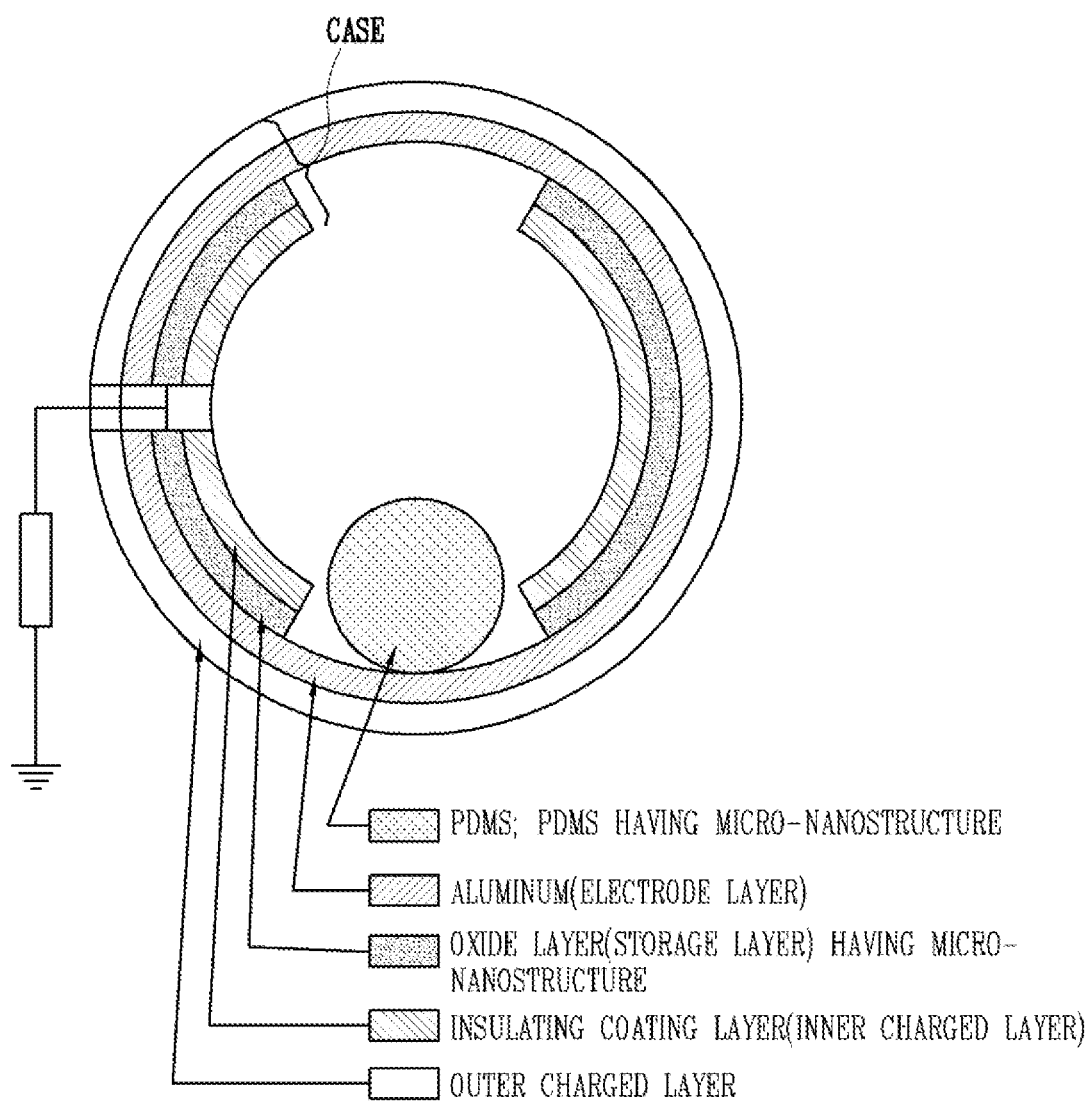
FIG. 1 is a conceptual view illustrating a spherical triboelectric nanogenerator in accordance with the present invention.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present invention, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Hereinafter, the present invention will be described in detail with reference to the accompanying drawings. In the following description, all embodiments of the present invention are not disclosed. The present invention may be embodied in many different forms and should not be construed as limited to the embodiments set forth herein. These embodiments are provided to satisfy legal requirements for application. Like reference numerals refer to like elements throughout.

The present invention relates to a spherical triboelectric nanogenerator capable of generating electric power from waves by contact electrification. Clean energy can be generated by collecting electric energy according to external force applied due to the waves or a contact with the waves.

When the wave power generator (the spherical triboelectric nanogenerator) according to the present invention is moved by external force due to waves (wave power), a charged sphere (charged body) is moved within a cavity (inner space). During this, electric energy may be generated due to a movement (contact electrification) of charges generated between the charged sphere and an insulating layer. (Internal power generation)

Further, when water is brought into contact with an external electrode layer due to the waves, the water may be positively charged and an outer insulating layer may be negatively charged, thereby generating induced current. (External power generation)

The spherical triboelectric nanogenerator according to the present invention has the following features.

As an embodiment, charges may be induced by an insulating layer and a charged sphere (charged body) which repeatedly moves toward and away from the insulating layer due to external force. That is, the charged body may be moved within the cavity due to wave power.

As another embodiment, a case having the insulating layer may have a cavity (inner space). At this time, the inner space may be hermetically sealed to prevent separation of the charged body.

As another embodiment, different insulating layers may be formed on inside and outside of the case, respectively, so as to enable not only an internal power generation using the inner insulating layer but also an external power generation using the outer insulating layer at the same time.

As another embodiment, the case may be formed in a spherical shape, so that energy can be efficiently harvested even in a low frequency domain.

Hereinafter, description will be given in detail of a structure (design) and operation principle of a spherical triboelectric nanogenerator according to the present invention.

FIG. 1 is a conceptual view illustrating a spherical triboelectric nanogenerator in accordance with the present invention.

Referring to FIG. 1, insulating layers cover outside and inside of a spherical electrode layer, and a small sphere (charged sphere) for charging is provided within the spherical electrode layer. As an embodiment, the charged sphere may be implemented as a PDMS to which a micro-nano structure is applied.

The insulating layers (insulating coating layer, charged layer) covering the outside and the inside are made of a fluorine-based polymer having a property of facilitating electron acquisition in a triboelectric series, and the electrode layer may be made of a metal having high conductivity and roughness in order to increase efficiency.

Hereinafter, description will be given in more detail of a structure of a spherical triboelectric nanogenerator according to the present invention.

The spherical triboelectric nanogenerator according to the present invention may include a case and a charged body.

Specifically, the case may have an inner space in a round shape, and be provided with an electrode layer. At this time, the electrode layer may be formed of aluminum.

Further, the charged body may be located in the inner space and be movable by external force.

In another embodiment, the case may include an inner charged layer formed on an inner surface of the electrode layer so as to be contactable with the charged body, and an outer charged layer formed to cover an outer surface of the electrode layer.

The spherical triboelectric nanogenerator may generate electricity based on at least one of friction between the outer charged layer and an external fluid and friction between the inner charged layer and the charged body which is generated in response to a movement of the charged body caused due to external force applied by the fluid.

As a detailed example, when waves hit, the spherical triboelectric nanogenerator according to the present invention may move. At this time, the charged body located inside the generator also moves. This results in an internal power generation that charges move between the charged body and the inner insulating layer (charged layer). In addition, induced current may be generated in response to the waves being brought into contact with the outer insulating layer (charged layer)

In one embodiment, the inner charged layer may be formed on a remaining portion except for a part of an inner surface of the electrode layer so that the part of the inner surface of the electrode layer can be brought into contact with the charged body.

In another embodiment, the outer charged layer may be formed of a material having hydrophobicity.

In another embodiment, the inner charged layer may be formed of a fluorine-based polymer material that facilitates electron acquisition.

In another embodiment, the charged body may be realized in a round (circular) shape with a surface having a nanostructure. As a representative example, the charged body may be formed in a spherical shape but is not limited to this.

In another embodiment, the generator may further include a storage layer formed at one of a position between the electrode layer and the inner charged layer and a position between the electrode layer and the outer charged layer, so as to store generated electric energy.

At this time, the storage layer may be formed as an oxide layer to which a nanostructure is applied.

As another example, the nanogenerator produced in the spherical shape may be fixed, and installed to be freely movable by force of the waves. If necessary, a structure in which the sphere of the electrode layer or the sphere of the charged layer is fixed may be utilized. A detailed example related to this will be described in FIG. 4.

Hereinafter, an operation principle of the spherical triboelectric nanogenerator will be described in detail.

Specifically, the fluid may be positively charged and the outer charged layer may be negatively charged due to the friction between the outer charged layer and the fluid. As the fluid moves, induced current may be generated in the electrode layer due to the negative charges of the outer charged layer.

In another embodiment, the inner charged layer and the charged body may be electrified into different electric charges due to the friction between the inner charged layer and the charged body. In order to electrify the electrode layer by the charges electrified in the inner charged layer, the negative or positive charges may be moved to the electrode layer, thereby generating the induced current.

On the other hand, as described above, the spherical triboelectric nanogenerator can achieve both of internal power generation and external power generation. In detail, the internal power generation and the external power generation refer to generating electricity inside the nanogenerator and outside the nanogenerator, respectively.

Figure 2:
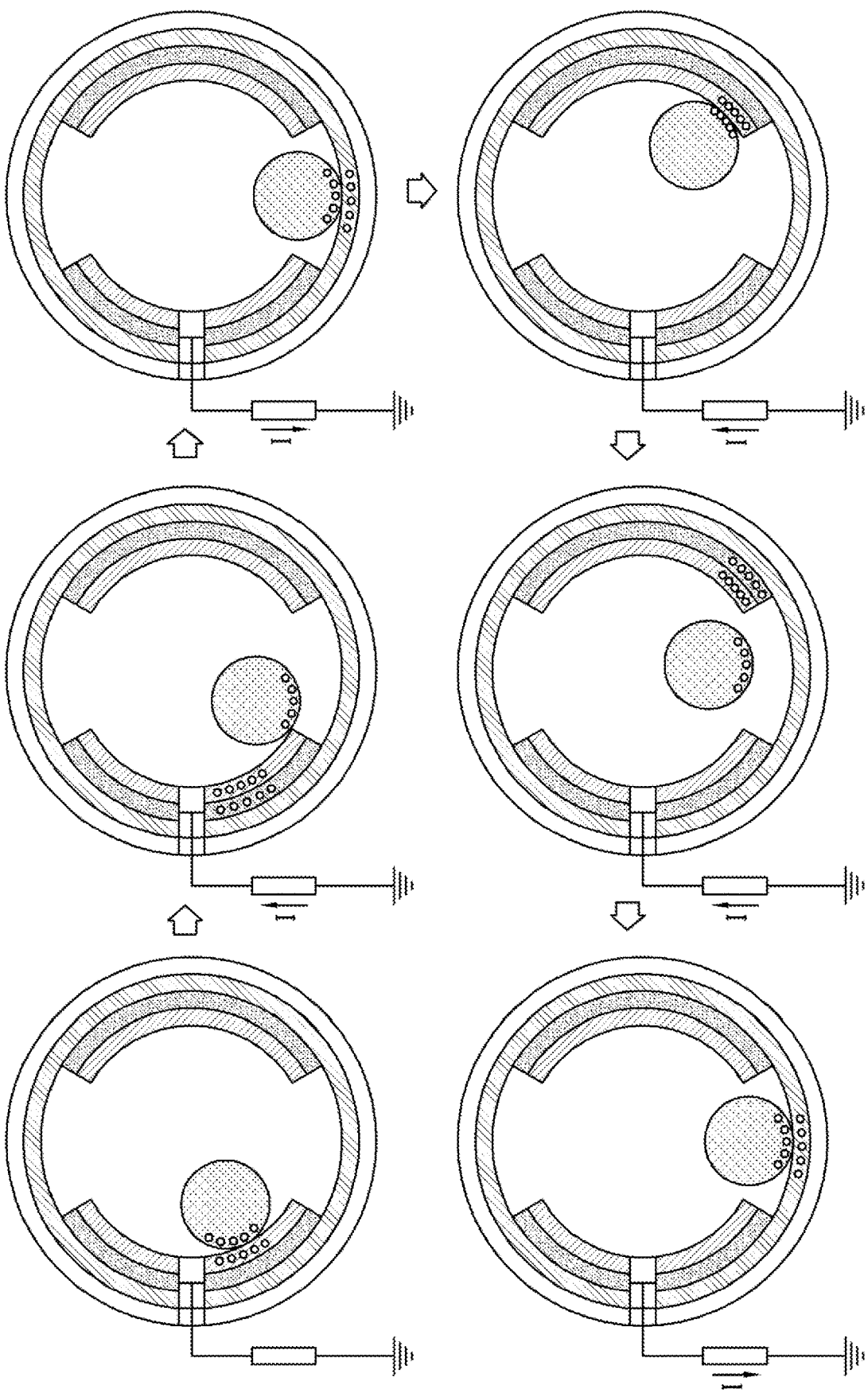
FIG. 2 is a conceptual view illustrating an internal power generation principle of the spherical triboelectric nanogenerator in accordance with the present invention.

FIG. 2 is a conceptual view illustrating an internal power generation principle of the spherical triboelectric nanogenerator in accordance with the present invention.

Referring to FIG. 2, when friction is caused between an insulating layer of a sphere of the electrode layer and a sphere for charging, one side is positively charged and another side is negatively charged depending on materials.

At this time, when the insulating layer of the sphere of the electrode layer is charged by receiving external force, in order for the electrode to be charged by the charged insulating layer, induced current in which negative or positive charges move toward the electrode layer is generated.

In detail, the charged sphere is moved by external force due to waves, so as to be brought into contact with the inner insulating layer (insulating coating layer, charged layer). Accordingly, when an outer contact surface of the charged to sphere is positively charged, the contacted inner insulating layer may be negatively charged.

When the inner insulating layer is negatively charged, positive charges are generated in the electrode layer. When the charged sphere is moved to be brought into direct contact with the electrode layer, negative charges may be generated in the electrode layer. As a result, the charges move to the electrode layer, and thus the induced current is generated.

Likewise, when the outer contact surface of the charged sphere is negatively charged, the contacted inner insulating layer may be positively charged.

When the inner insulating layer is positively charged, negative charges are generated in the electrode layer. When the charged sphere is moved to be brought into direct contact with the electrode layer, positive charges may be generated in the electrode layer. As a result, the charges move to the electrode layer, and thus the induced current is generated.

Figure 3:
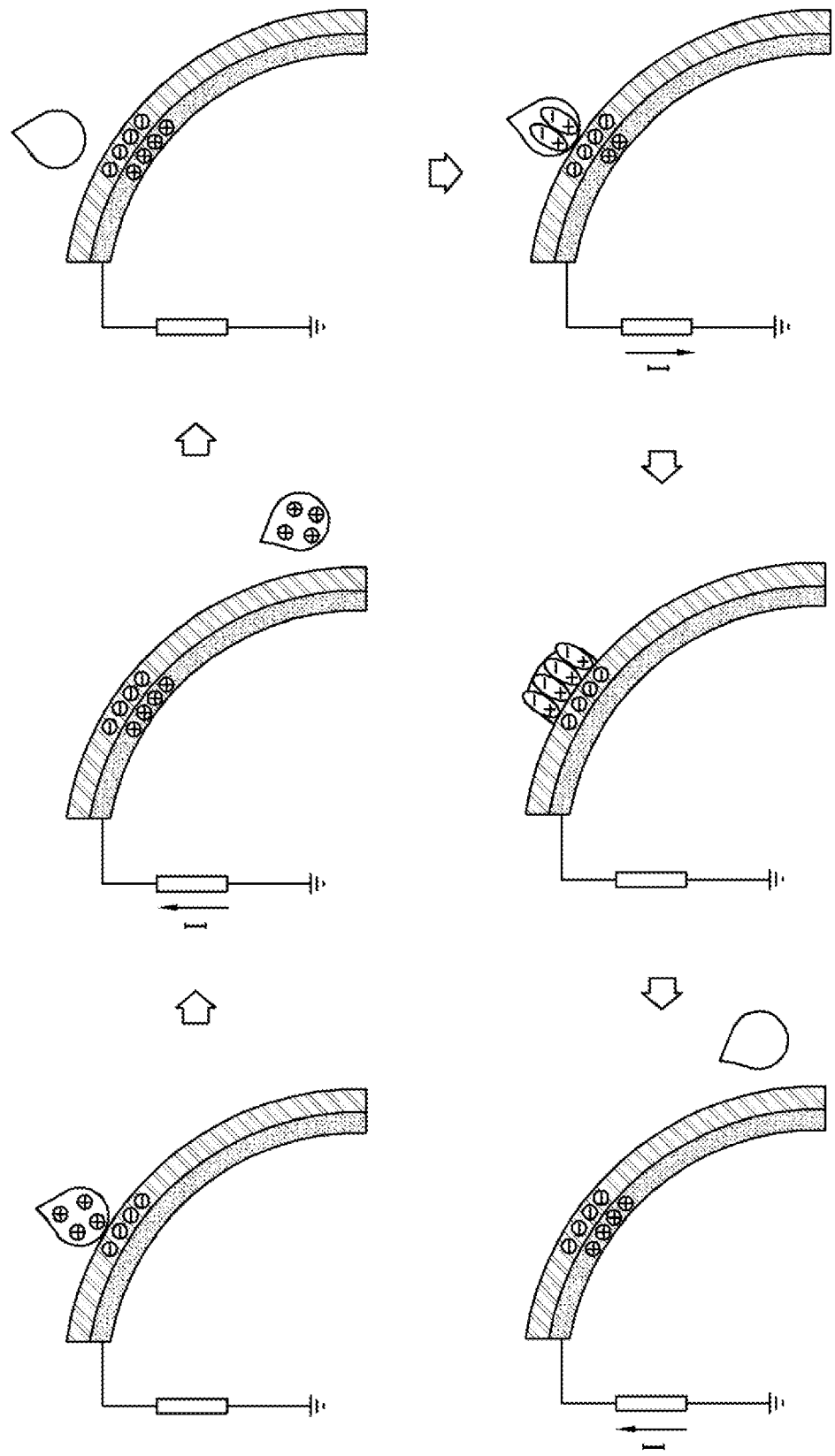
FIG. 3 is a conceptual view illustrating an external power generation principle of the spherical triboelectric nanogenerator in accordance with the present invention.

FIG. 3 is a conceptual view illustrating an external power generation principle of the spherical triboelectric nanogenerator in accordance with the present invention.

Referring to FIG. 3, when water is brought into contact with the outer insulating layer of the electrode layer sphere due to waves, the water is positively charged and the insulating layer is negatively charged.

At this time, induced current is generated in the electrode due to the negative charges of the insulating layer at the moment when the water falls.

According to a representative example, the spherical triboelectric nanogenerator according to the present invention may include a case having an inner space in a round shape and provided with an electrode layer, and a charged body located in the inner space and movable by external force caused due to waves.

At this time, the case may include an inner charged layer formed on an inner surface of the electrode layer to be contactable with the charged body, and an outer charged layer formed to cover an outer surface of the electrode layer.

Explaining a power generation principle, when water is brought into contact with the outer charged layer by waves, the water is positively charged and the outer charged layer is negatively charged, thereby generating induced current. While the charged body is moved by the external force due to the waves, charges may be moved between the charged body and the inner charged layer, thereby generating the induced current.

Meanwhile, the spherical triboelectric nanogenerator according to the present invention may further include a support unit connected to the case or the charged body so as to be fixed on the ground.

Figure 4:
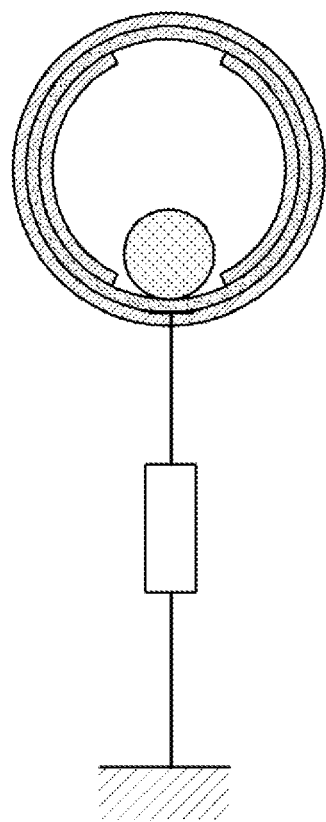
FIG. 4 is a conceptual view illustrating an embodiment in which the spherical triboelectric nanogenerator according to the present invention is fixed on the ground.

FIG. 4 is a conceptual view illustrating an embodiment in which the spherical triboelectric nanogenerator according to the present invention is fixed on the ground.

Referring to FIG. 4, a structure of fixing the spherical triboelectric nanogenerator on the ground is illustrated.

As an embodiment, when the case is fixed so as not to move, only the inner charged body may be movable within the case by the external force due to the waves. Even in this case, the external power generation can be achieved by the movement of the waves.

In another embodiment, the case may be connected to a support by a ring or the like in a manner of being rotatable (rotatable in place) by a predetermined angle due to external force applied by waves. In this instance, the inner charged body may be moved by the external force due to the waves, and simultaneously the case may also be rotated, thereby generating induced current due to friction.

In another embodiment, the case may be connected to a support to be oscillated (vibrated) by a predetermined angle by external force due to waves. That is, the case moves together with the inner charged body due to the external force by the waves, and the induced current may be generated due to friction therebetween.

As an embodiment, when the charged body is fixed so as not to move, only the case may be movable by the external force due to the waves. In detail, the case may be connected to a support by a ring or the like in a manner of being rotated or shaken by a predetermined angle due to the external force applied by the waves. At this time, a contact area of the charged body may change due to the movement of the case and accordingly an internal power generation can be performed.

In another embodiment, when the charged body is provided so as to be movable, the inner charged body and the case may simultaneously be rotated so as to be brought into contact with each other due to the external force applied by the waves. To this end, the charged body may be connected to the support in a manner of being rotated or oscillated (vibrated, shaken) by a predetermined angle.

Referring to FIG. 4, the spherical triboelectric nanogenerator may be fixed by connecting the case to the support.

At this time, only one of the case and the charged body which is not fixed may be rotated (or shaken, vibrated) or both of the case and the charged body may be rotated (shaken, vibrated) by the electric force due to the waves. Then, a contact surface due to the rotation (vibration, shaking) may change and accordingly the induced current may be generated. As a result, the internal power generation and the external power generation can be performed at the same time.

The spherical triboelectric nanogenerator according to the present invention can acquire the following effects.

According to at least one of the embodiments of the present invention, inside and outside of the nanogenerator can be simultaneously used for power generation so as to increase efficiency, as compared to the related art nanogenerator generating electricity only for one part of a surface thereof.

In addition, according to at least one of the embodiments of the present invention, a spherical nanogenerator having a different fixed portion depending on a situation can be constructed, so as to enable efficient energy harvesting by waves, and a design of the spherical shape can result in reducing an energy loss due to frictional force and increasing energy conversion efficiency.

And, by applying the spherical shape to the triboelectric nanogenerator harvesting waves, energy can be efficiently harvested even in a low frequency domain.

As another effect, clean energy can be generated by collecting electric energy by virtue of external force due to waves or a contact with the waves.

The above detailed description should not be limitedly construed and should be considered illustrative in all aspects. The scope of the present invention should be determined by rational interpretation of the appended claims, and all changes within the scope of equivalents of the present invention are included in the scope of the present invention.

What is claimed is:

1. A spherical triboelectric nanogenerator, comprising:
   a case having an inner space in a round shape and provided with an electrode layer; and
   a charged body located in the inner space and movable by external force,
   wherein the case comprises:
   an inner charged layer formed on an inner surface of the electrode layer to be contactable with the charged body; and
   an outer charged layer formed to cover an outer surface of the electrode layer, and
   wherein the nanogenerator generates electricity based on at least one of friction between the outer charged layer and an external fluid and friction between the inner charged layer and the charged body, which is generated as the charged body is moved due to external force applied by the fluid, wherein the inner charged layer is formed on a part of the inner surface of the electrode layer, wherein the charged body is formed to be in contact with the inner charged layer formed on the part of the inner surface of the electrode layer or to be in direct contact with the electrode layer through another part of the inner surface of the electrode layer on which the inner charged layer is not formed by the external force, wherein the electrode layer is charged with different polarities depending on whether the charged body is in contact with the inner charged layer or is in direct contact with the electrode layer.

2. The nanogenerator of claim 1, wherein the outer charged layer is formed of a material having hydrophobicity.

3. The nanogenerator of claim 1, wherein the inner charged layer is formed of a fluorine-based polymer material facilitating electricity acquisition.

4. The nanogenerator of claim 1, wherein the charged body is realized in a round shape with a surface having a nanostructure.

5. The nanogenerator of claim 1, further comprising a storage layer formed on at least one of a position between the electrode layer and the inner charged layer and a position between the electrode layer and the outer charged layer, to store generated electric energy.

6. The nanogenerator of claim 5, wherein the storage layer is formed as an oxide layer to which the nanostructure is applied.

7. The nanogenerator of claim 1, further comprising a support unit connected to the case or the charged body to be fixed on the ground.

8. The nanogenerator of claim 1, wherein the fluid is positively charged and the outer charged layer is negatively charged due to the friction between the outer charged layer and the fluid, and induced current is generated in the electrode layer by the negative charges of the outer charged layer in response to a movement of the fluid.

9. The nanogenerator of claim 1, wherein the inner charged layer and the charged body are charged into different charges, respectively, due to friction therebetween, and induced current is generated in response to a movement of negative or positive charges to the electrode layer such that the electrode layer is charged by the charges of the inner charged layer.

* * * * *